(12) United States Patent
Garg et al.

(10) Patent No.: US 12,242,372 B2
(45) Date of Patent: Mar. 4, 2025

(54) PERFORMANCE BUG REPAIR VIA RETRIEVAL-AUGMENTED NEURAL CODE GENERATION MODEL

(71) Applicant: MICROSOFT TECHNOLOGY LICENSING, LLC., Redmond, WA (US)

(72) Inventors: Spandan Garg, Redmond, WA (US); Neelakantan Sundaresan, Bellevue, WA (US); Roshanak Zilouchian Moghaddam, Kirkland, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 159 days.

(21) Appl. No.: 18/124,185

(22) Filed: Mar. 21, 2023

(65) Prior Publication Data

US 2024/0248686 A1 Jul. 25, 2024

Related U.S. Application Data

(60) Provisional application No. 63/441,169, filed on Jan. 25, 2023.

(51) Int. Cl.
G06F 11/36 (2006.01)
G06F 8/35 (2018.01)
(Continued)

(52) U.S. Cl.
CPC .......... *G06F 11/3692* (2013.01); *G06F 8/35* (2013.01); *G06F 8/36* (2013.01); *G06F 11/3668* (2013.01)

(58) Field of Classification Search
None
See application file for complete search history.

(56) References Cited

U.S. PATENT DOCUMENTS

2007/0180430 A1* 8/2007 Farchi .................... G06F 11/36
717/126
2013/0179863 A1* 7/2013 Vangala ................... G06F 8/74
717/124
(Continued)

FOREIGN PATENT DOCUMENTS

WO 2022164667 A1 8/2022
WO 2023279254 A1 1/2023

OTHER PUBLICATIONS

Brown, et al., "Language Models Are Few-Shot Learners", In Proceedings of 34th Conference on Neural Information Processing Systems, Dec. 6, 2020, 25 Pages.
(Continued)

*Primary Examiner* — Qing Chen

(57) ABSTRACT

A pre-trained neural code generation model generates repair code for a method containing a performance bug given a prompt including a code transformation instruction. The code transformation instruction guides the model on how to predict the repair code when the model has not been fine-tuned for the repair code task. The code transformation instruction is retrieved from abstract bug patterns derived from historical performance bug fixes found in commits to a source code repository. The augmentation of the code transformation instruction in the prompt to the pre-trained neural code generation model provides the model with a hint on how the repair code may be generated based on similar performance bug fixes.

20 Claims, 7 Drawing Sheets

(51) Int. Cl.
  *G06F 8/36* (2018.01)
  *G06F 11/3668* (2025.01)

(56) References Cited

U.S. PATENT DOCUMENTS

2015/0074651 A1* 3/2015 Chockler ............ G06F 11/3616
  717/126
2021/0182031 A1* 6/2021 Ye ............................. G06F 8/34

OTHER PUBLICATIONS

Legenzoff, et al., "Azure OpenAI Service Models", Retrieved From: https://learn.microsoft.com/en-us/azure/cognitive-services/openai/concepts/models, Mar. 30, 2023, 10 Pages.

Lester, et al., "The Power of Scale for Parameter-Efficient Prompt Tuning", In Repository of arXiv:2104.08691v2, Sep. 2, 2021, 15 Pages.

Li, et al., "Prefix-Tuning: Optimizing Continuous Prompts for Generation", In Repository of arXiv:2101.00190v1, Jan. 1, 2021, 15 Pages.

Liu, et al., "GPT Understands, Too", In Repository of arXiv:2103.10385v1, Mar. 18, 2021, 10 Pages.

Liu, et al., "Pre-train, Prompt, and Predict: A Systematic Survey of Prompting Methods in Natural Language Processing", In Journal of ACM Computing Surveys, vol. 55, Issue 9, Jan. 16, 2023, 35 Pages.

Lu, et al., "Fantastically Ordered Prompts and Where to Find Them: Overcoming Few-Shot Prompt Order Sensitivity", In Repository of arXiv:2104.08786v1, Apr. 18, 2021, 11 Pages.

Maxwell, et al., "Application Insights Overview", Retrieved From: https://learn.microsoft.com/en-us/azure/azure-monitor/app/app-insights-overview?tabs=net, Mar. 14, 2023, 6 Pages.

Papineni, et al., "BLEU: A Method for Automatic Evaluation of Machine Translation", In the Proceedings of the 40th Annual Meeting of the Association for Computational Linguistics, Jul. 2002, pp. 311-318.

Petroni, et al., "Language Models as Knowledge Bases?", In Repository of arXiv:1909.01066v2, Sep. 4, 2019, 11 Pages.

Pialorsi, et al., "Introducing Microsoft® Linq", Retrieved From: https://pedrogalvaojunior.files.wordpress.com/2011/04/introducing-microsoft-linq.pdf, 2007, 203 Pages.

Chi, et al., "SeqTrans: Automatic Vulnerability Fix Via Sequence to Sequence Learning", IEEE Transactions on Software Engineering, vol. 49, Issue. 2, Mar. 7, 2022, pp. 564-585.

International Search Report and Written Opinion received for PCT Application No. PCT/US2023/086332, Apr. 15, 2024, 12 pages.

"Conventional Commits", Retrieved from: https://web.archive.org/web/20191001003129/https://www.conventionalcommits.org/en/v1.0.0/, Oct. 1, 2019, 7 Pages.

Attariyan, et al., "X-ray: Automating Root-Cause Diagnosis of Performance Anomalies in Production Software", In 10th USENIX Symposium on Operating Systems Design and Implementation, Oct. 8, 2012, pp. 307-320.

Austin, et al., "Multiple Facets For Dynamic Information Flow", In Proceedings of the 39th Annual ACM SIGPLAN-SIGACT Symposium on Principles of Programming Languages, Jan. 25, 2012, pp. 165-178.

Berabi, et al., "TFix: Learning to Fix Coding Errors with a Text-to-Text Transformer", In Proceedings of International Conference on Machine Learning, Jul. 1, 2021, 12 Pages.

Bielik, et al., "Learning a Static Analyzer From Data", In Proceedings of International Conference on Computer Aided Verification, Jul. 24, 2017, pp. 233-253.

Chen, et al., "Evaluating Large Language Models Trained on Code", In Proceedings of IEEE Transactions on Software Engineering vol. 49, Issue 1, Jul. 7, 2021, 35 Pages.

Chen, et al., "Inferring Performance Bug Patterns From Developer Commits", In Proceedings of IEEE 30th International Symposium on Software Reliability Engineering, Oct. 1, 2019, pp. 70-81.

Chen, et al., "Neural Transfer Learning For Repairing Security Vulnerabilities In C Code", In Repository of arXiv:2104.08308v3, Feb. 1, 2022, pp. 147-164.

Dean, et al., "Perfscope: Practical Online Server Performance Bug Inference in Production Cloud Computing Infrastructures", In Proceedings of the ACM Symposium on Cloud Computing, Nov. 3, 2014, pp. 1-13.

Drain, et al., "Deepdebug: Fixing Python Bugs Using Stack Traces, Backtranslation, And Code Skeletons", In Repository of arXiv:2105.09352v1, May 19, 2021, pp. 1-11.

Fu, et al., "Vulrepair: A T5-Based Automated Software Vulnerability Repair", In Proceedings of the 30th ACM Joint European Software Engineering Conference and Symposium on the Foundations of Software Engineering, Nov. 9, 2022, pp. 935-947.

Garg, et al., "Deepdev-Perf: A Deep Learning-Based Approach For Improving Software Performance", In Proceedings of the 30th ACM Joint European Software Engineering Conference and Symposium on the Foundations of Software Engineering, Nov. 9, 2022, pp. 948-958.

Garg, et al., "Perflens: A Data-Driven Performance Bug Detection And Fix Platform", In Proceedings of the 10th ACM SIGPLAN International Workshop on the State Of the Art in Program Analysis, Jun. 22, 2021, pp. 19-24.

Iqbal, et al., "CADET: A Systematic Method For Debugging Misconfigurations Using Counterfactual Reasoning", In Repository of arXiv:2010.06061v2, Mar. 8, 2021, 14 Pages.

Jiang, et al., "How Can We Know What Language Models Know?", In Proceedings of Transactions of the Association for Computational Linguistics, Jul. 1, 2020, pp. 423-438.

Jovic, et al., "Catch Me If You Can: Performance Bug Detection In The Wild", In Proceedings of the ACM international conference on Object oriented programming systems languages and applications, Oct. 22, 2011, pp. 155-170.

Kim, et al., "Automatic Patch Generation Learned From Human-Written Patches", In Proceedings of the International Conference on Software Engineering, May 18, 2013, pp. 802-811.

Lewis, et al., "BART: Denoising Sequence-to-Sequence Pre-training for Natural Language Generation, Translation, and Comprehension", In Proceedings of the 58th Annual Meeting of the Association for Computational Linguistics, Jul. 5, 2020, pp. 7871-7880.

Lin, et al., "Quixbugs: A Multi-Lingual Program Repair Benchmark Set Based On The Quixey Challenge", In Proceedings of Companion of the ACM SIGPLAN International Conference on Systems, Programming, Languages, and Applications: Software for Humanity, Oct. 22, 2017, pp. 55-56.

Luan, et al., "Aroma: Code Recommendation Via Structural Code Search", In Proceedings of the ACM on Programming Languages, vol. 3, Oct. 10, 2019, pp. 1-28.

Nistor, et al., "Discovering, Reporting, And Fixing Performance Bugs", In Proceedings of 10th working conference on mining software repositories, May 18, 2013, pp. 237-246.

Pearce, et al., "Examining Zero-Shot Vulnerability Repair With Large Language Models", in Repository arXiv:2112.02125v3, Dec. 3, 2021, 18 Pages.

Prenner, et al., "Can Openai's Codex Fix Bugs?: An Evaluation On Quixbugs", In Proceedings of the Third International Workshop on Automated Program Repair, Oct. 26, 2022, pp. 69-75.

Raffel, et al., "Exploring The Limits of Transfer Learning With A Unified Text-to-Text Transformer", In Journal of Machine Learning Research, vol. 21, Issue 1, Jan. 1, 2020, pp. 1-67.

Ren, et al., "CodeBLEU: A Method for Automatic Evaluation of Code Synthesis", In Repository of arXiv:2009.10297v1, Sep. 22, 2020, 8 Pages.

Song, et al., "Statistical Debugging For Real-World Performance Problems", In Proceedings of the ACM International Conference on Object Oriented Programming Systems Languages & Applications, Oct. 15, 2014, pp. 561-578.

Toffola, et al., "Performance Problems You Can Fix: A Dynamic Analysis of Memoization Opportunities", In Journal of ACM SIGPLAN Notices, vol. 50, Issue 10, Oct. 23, 2015, pp. 607-622.

Tufano, et al., "An Empirical Investigation Into Learning Bug-Fixing Patches in the Wild via Neural Machine Translation", In

(56) References Cited

OTHER PUBLICATIONS

Proceedings of the 33rd ACM/IEEE International Conference on Automated Software Engineering, Sep. 3, 2018, pp. 832-837.

Wei, et al., "Chain of Thought Prompting Elicits Reasoning In Large Language Models", In Repository of arXiv:2201.11903v1, Jan. 28, 2022, 24 Pages.

Weimer, et al., "Automatically Finding Patches Using Genetic Programming", In Proceedings of the 31st International Conference on Software Engineering, May 16, 2009, pp. 364-374.

Wen, et al., "Context-Aware Patch Generation For Better Automated Program Repair", In Proceedings of the 40th International Conference on Software Engineering, May 27, 2018, pp. 1-11.

Wong, et al., "Varfix: Balancing Edit Expressiveness And Search Effectiveness In Automated Program Repair", In Proceedings of the 29th ACM Joint Meeting on European Software Engineering Conference and Symposium on the Foundations of Software Engineering, Aug. 20, 2021, pp. 354-366.

Ye, et al., "A Comprehensive Study of Automatic Program Repair on the Quixbugs Benchmark", In Journal of Systems and Software, Jan. 2021, pp. 1-17.

* cited by examiner

PERFORMANCE BUG REPAIR VIA RETRIEVAL-AUGMENTED NEURAL CODE GENERATION MODEL

CROSS-REFERENCE TO RELATED APPLICATIONS

The present application claims the benefit of the earlier filed provisional application having Ser. No. 63/441,169 filed on Jan. 25, 2023, which is incorporated by reference in its entirety.

BACKGROUND

A source code bug is an error in a source code program that causes the program to behave in an unintended manner, such as producing erroneous results. There are various types of source code bugs. A functional bug is one where the program fails to perform in accordance with a functional description or specification. A compiler error is a type of software bug that fails to conform to the syntax of a programming language of the program. A runtime error occurs during runtime such as logic errors, I/O errors, undefined object errors, division by zero errors, etc.

Performance bugs differ from source code bugs, such as functional bugs, compiler errors and runtime errors, since they do not produce an erroneous result. By contrast, a performance bug is a programming defect that causes significant performance degradation, such as excessive resource usage, increased latency, reduced throughput, and overall degraded performance. Examples of a performance bug include repeated computations, software misconfigurations, and loop inefficiencies. Performance bugs are difficult to detect due to the absence of fail-stop symptoms. With the increased complexity of software systems, there is an emphasis on the efficient use of resources and hence, improvements in detecting and remedying performance bugs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A pre-trained neural code generation model generates repair code for a buggy method containing a performance bug given a prompt including the buggy method, a code transformation instruction, and optionally a partially-formed method signature of the buggy method. The code transformation instruction guides the model to learn to predict repair code to fix the performance bug since the neural code generation model has not been fine-tuned for the repair code task. The code transformation instruction is based on an abstract bug pattern that is common to repair fixes having a similar performance bug. The abstract bug pattern is derived from historical performance bug fixes extracted from commits of a source code repository.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to an automated system for generating repair code for a source code method having a performance bug using a retrieval-augmented neural code generation model. The retrieval-augmented neural code generation model utilizes a code transformation instruction to guide the model towards generating repair code since the model has not been fine-tuned on the repair code task.

A performance bug in a source code program does not usually cause a system failure which makes these bugs harder to detect and fix compared to other types of software bugs. A neural code generation model pre-trained to learn to generate source code is used to predict the repair code for a source code method having a performance bug. The neural code generation model is given a prompt that includes a code transformation instruction that indicates how to change a method with the performance bug into a more efficient method without the performance bug.

The code transformation instruction is derived from historical patterns of source code fixes for performance bugs. The historical patterns for performance bugs fixes are obtained from mining commits of source code repositories and analyzing the code changes made to produce the repair code that fixes performance bugs. Each historical pattern of source code fixes is transformed into an abstract bug pattern and then into a code transformation instruction that guides the model on how to generate the repair code.

The neural code generation model is given an input or prompt that includes the method containing the performance bug, the code transformation instruction indicating how a fix was made to a similar performance bug, and the starting fragment of the method signature of the repair code. From this input, the neural code generation model generates source code to finish the repair code method.

The construction of the prompt that is used by the neural code generation model has several advantages. The use of the code transformation instruction in the prompt avoids the expensive fine-tuning step that teaches the model how to learn from training samples to predict repair code. Instead, the code transformation instruction guides a model, not having been trained on the task of generating repair code, with a hint on how to generate the repair code. The term zero-shot is used to describe a model that learns to make a prediction from unseen data. The use of the guide provides the neural code generation model with a zero-shot capability to predict a performance bug repair code.

Additionally, the knowledge database can be easily extended for other types of software bugs by growing the number of commits and to other programming languages without requiring the neural code generation model to be retrained.

Attention now turns to a system, device, and method of the performance bug repair system.

System

Figure 1:
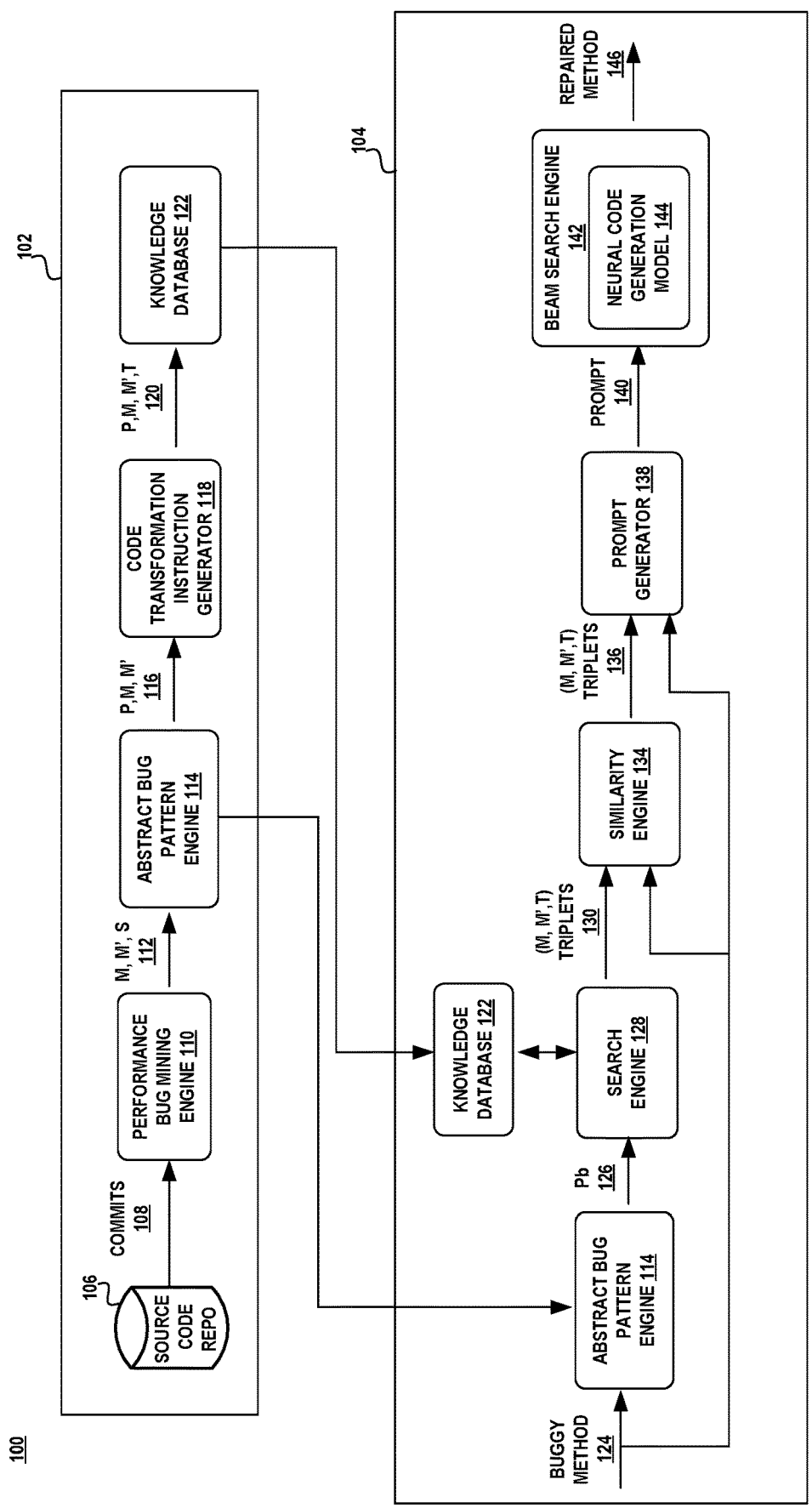
FIG. 1 illustrates an exemplary performance bug repair system having a knowledge-database generation phase and an inference phase.

FIG. 1 represents an exemplary performance bug repair system 100 for generating repair code for a source code fragment (e.g., method, source code snippet, Application Programming Interface (API)) having a performance bug. The system 100 includes a knowledge-database generation phase 102 and an inference phase 104. In the knowledge-database generation phase 102, a knowledge database 122 is generated containing code transformation instructions and related methods. In the inference phase 104, the knowledge database 122 is used to retrieve a code transformation instruction that augments the prompt that is given to a neural code generation model 144. In an aspect, the knowledge-based generation phase 102 operates separately from the inference phase 104 and is pre-configured before the inference phase operates. The inference phase 104 operates in real-time within a target system.

The knowledge-database generation phase 102 includes one or more source code repositories 106, a performance bug mining engine 110, an abstract bug pattern engine 114, a code transformation instruction generator 118, and the knowledge database 122. The knowledge database 122 is generated from data found in commits 108 associated with source code methods having been corrected for a performance bug. The performance bug mining engine 110 mines a version-controlled source code repository 106 for pull requests having commits that are associated with modifications made to correct a performance bug. The version-controlled source code repository 106 may be a file archive and web hosting facility that stores large amounts of source code either privately or publicly. The source code programs residing in the source code repositories vary and are written in different programming languages. The selected source code programs come from different domains, such as without limitation, scientific computing, web development, data-flow programming, machine learning, and the like.

The performance bug mining engine 110 finds source code methods containing a performance bug from the commits and obtains a version of the method before the performance bug was fixed (i.e., before-method, m), the method after the performance bug was fixed (i.e., after-method, m') and a set of statements, S, in the before-method that are not in the after-method 112.

The abstract bug pattern engine 114 transforms the set of statements, S, into an abstract bug pattern where project-specific identifiers, such as variable names and user-defined function names, are replaced with placeholders. An abstract bug pattern, p, represents a pattern that may occur repeatedly across different programs, source code repositories or projects having a common performance bug.

The code transformation instruction generator 118 generates an instruction, T, which indicates the code transformations needed for the repair. The code pattern, p, the before-method, m, the after-method, m', and the transformation instruction, T, 120, are then used to generate the knowledge database 122. The code pattern p is used as the index into the knowledge database. The knowledge database 122 is used in the inference process 104 to find a code transformation instruction to augment the prompt given to the neural code generation model 144.

In the inference phase 104, the system utilizes the abstract bug pattern engine 114, a search engine 128, the knowledge database 122, a similarity engine 134, a prompt generator 138, and a beam search engine 142 that interacts with the neural code generation model 144.

A source code method having a performance bug 124 is obtained and processed to generate a repaired method without the performance bug 146. The abstract bug pattern engine 114 receives the buggy method 124 and generates an abstract bug pattern 126 from the lines of source code that contain the performance bug, $p_b$. The abstract bug pattern 126 is used as an index by the search engine 128 to obtain associated code transformation instruction triplets matching the abstract bug pattern. The triplets contain a before-method, m, after-method, m', and code transformation instruction T 130.

The search engine 128 may find several code transformation instruction triplets from the knowledge database 122. The similarity engine 134 ranks the triplets 130 based on how close the before-method associated with each triplet matches the buggy method 124. The triplet having the highest-ranked before-method is used to form the prompt 140 for the neural code generation model 144. In one aspect, the prompt generator 138 forms the prompt as a combination of the buggy method 124 surrounded by comment characters, the code transformation instruction, and the start of the buggy method signature. The beam search engine 142 receives the prompt and initiates a search for repair code using the neural code generation model 144.

The neural code generation model 144 is a deep learning model trained to generate source code given an input. In an aspect, the neural code transformation model is a neural transformer model with attention. A neural transformer model with attention is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

There are various configurations of a neural transformer model with attention that may be used to as the neural code generation model. Exemplary configurations include an encoder-decoder transformer network or a decoder-only transformer network. In an aspect, the neural code generation model is configured as a decoder-only neural transformer model with attention.

The decoder-only neural transformer model with attention contains a series of stacked decoder blocks. The decoder-only neural transformer model with attention generates each token of a repair code candidate autoregressively, one token at a time. Each decoder block consists of two layers. The first layer includes a masked multi-head self-attention component followed by a layer normalization component. The output of the layer normalization component is input into the second layer which includes a feed-forward neural network with a residual connection to another layer normalization component.

The first input to the first decoder block is the prompt represented as an input sequence of embeddings of tokens. Thereafter, the input is the output embeddings of the previous timestep. The masked multi-head self-attention component masks the output embeddings from future time steps. The feed-forward neural network processes each output encoding separately. A layer normalization component is used between the layers in order to normalizes the inputs across the features.

The output layer includes a linear layer and a softmax layer. The linear layer projects the vector produced by the stack of decoders into a logits vector. The softmax layer then turns the scores of the logits vector into output probabilities for each token in the model's vocabulary which are positive and normalized.

Examples of a decoder-only neural transformer model with attention that generate source code includes OpenAI's Generative Pre-trained Transformer (GPT) models (GPT-1, GPT-2, GPT-3), Codex, Code-Davinci-002, Text-Davinci-002, Cushman models, and other autoregressive large language models.

The GPT models are pre-trained on natural language text to learn to predict natural language text that completes a partially-formed natural language text segment. Codex is pre-trained on natural language text and source code and is used to predict source code that corresponds to a natural language text query. Codex receives a comment describing the operation of a source code method (e.g., function, API) and generates source code that performs the requested operations.

It should be noted that the neural code generation model may be configured in an encoder-decoder network configuration. An encoder-decoder transformer network consists of a series of stacked encoder blocks coupled to a series of stacked decoder blocks. The encoder blocks extract features from an input sequence to generate embeddings for each token in the input sequence, and the decoder uses the features to produce an output sentence representing repair code candidates.

The training of a neural network is a complicated and time-consuming task since there is no method to select the optimal parameters for a neural network without testing and validating the neural network to meet a target objective. The training of a neural network, such as a neural transformer model with attention, requires a configuration of the decoder transformer network. A set of parameters must be defined such as the number of hidden layers, the number of neurons in each layer, and the backpropagation method used to train the decoders.

The set of hyperparameters is selected randomly. A hyperparameter is a parameter associated with the neural network model architecture, the training algorithms, and data normalization, which is set before the start of the training. A hyperparameter is not learned by the neural network. The hyperparameters are selected at random from a set of categorical values or, for real valued hyperparameters like learning rate, drawn at random from a given range. Hyperparameters are tuned based on the performance of the neural network when tested using the validation dataset.

The training of the neural transformer model is a computationally intensive effort which requires parallel data processing. One or more clusters may be used to train the neural transformer model where each cluster contains a set of loosely or tightly coupled computers (e.g., processors, processing units, cores) that perform the same task simultaneously under the control of distributed controller. Each computer works off the same copy of the neural transformer model and uses distributed data parallel training algorithms to synchronize the processing between the clusters.

The neural code generation transformer model with attention is trained using batching where the training dataset is partitioned into batches of a certain size and processed before the model is updated. The size of a batch must be more than or equal to one and less than or equal to the number of samples in the training dataset. A portion of the sequences are used as the training dataset and another portion is used as the validation dataset. The training dataset is partitioned into epochs and then the sequences in each epoch are partitioned into batches. Each sequence in each batch in each epoch is then used to train the neural transformer model.

Pre-training is the process where the model's parameters (e.g., embeddings, weights, biases) are learned from unsupervised data. The model learns the parameters through the optimization of the cost function used by the neural network layer of the model. The cost function determines the error loss from the previous epoch which is then backpropagated to the preceding layers of the model. The model's parameters are updated through backpropagation based on the error loss determined by the cost function.

The optimization of the cost function used in the neural network layer of the model determines the error loss from the previous epoch which is then backpropagated to the preceding layers of the model. The model's parameters are updated through backpropagation based on the error loss determined by the cost function. Once the model is fully trained, the model's embeddings are stored in a separate data structure and used in the inference process to transform an input sequence of tokens into a sequence of input embeddings. Each token in an input sequence is converted into its corresponding embedding resulting in the sequence of input embeddings that is applied to the model.

Pre-training and fine-tuning are both training processes. Pre-training uses training samples that do not have labeled outputs, so its goal is to learn to predict the output with the set of training samples. Fine-tuning is the process where the model's parameters are learned or updated from supervised data. Supervised data contains labeled output representing the known output values for the training samples. In an aspect, the neural code generation model is pre-trained on source code to learn to predict source code to complete a partially-formed source code snippet and not fine-tuned for the repair code task.

The performance bug mining engine 110, the abstract bug pattern engine 114, the code transformation instruction generator 118, the search engine 128, the similarity engine 134, the prompt generator 138, and the beam search engine 142 may be a sequence of computer program instructions, that when executed by a processor, causes the processor to perform methods and/or operations in accordance with a prescribed task. The abstract bug pattern engine 114, the code transformation instruction generator 118, the search engine 128, the similarity engine 134, the prompt generator 138, and the beam search engine 142 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Attention now turns to a more detailed description of the application of the performance bug repair system.

Repair System Applications

Figure 2A:
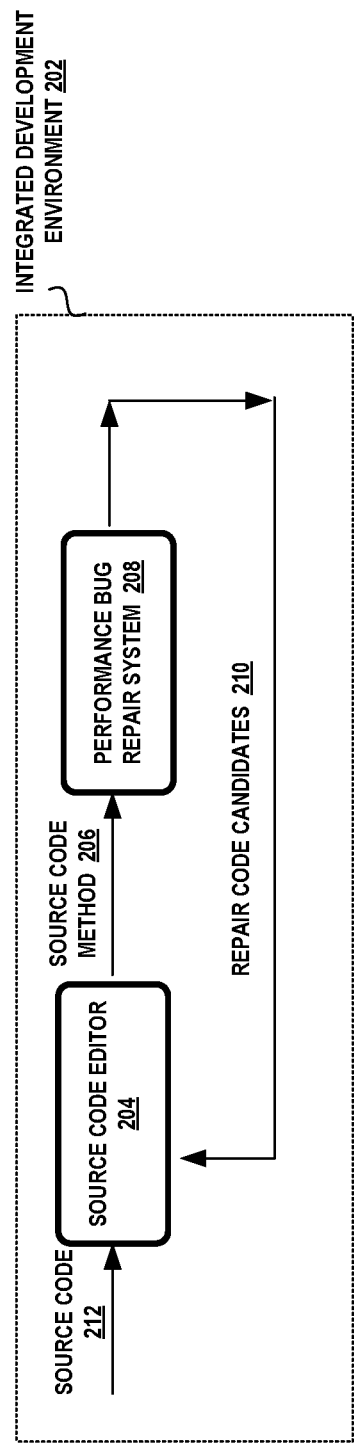
FIGS. 2A-2B illustrate exemplary implementations of the performance bug repair system.
Figure 2B:
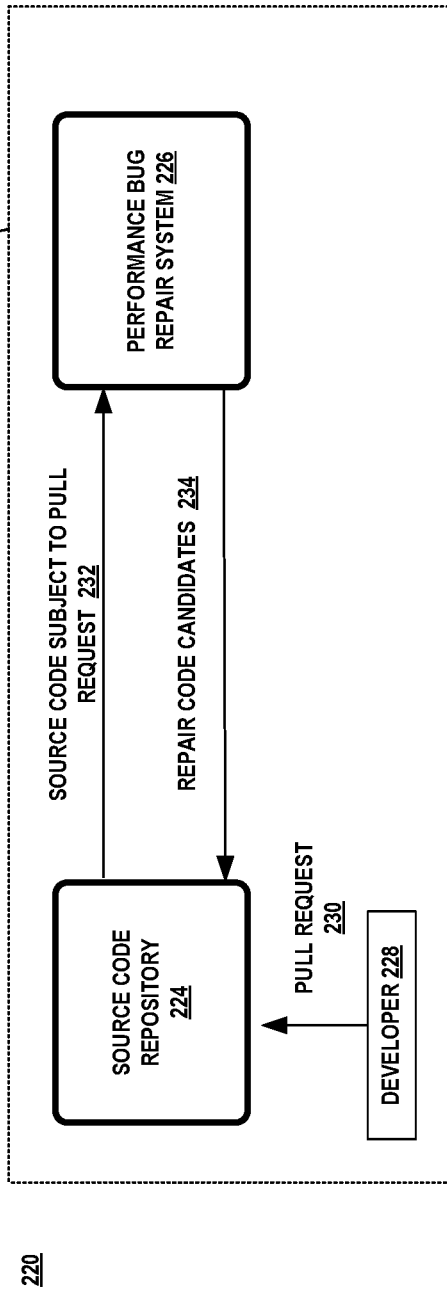

FIGS. 2A and 2B illustrate exemplary systems utilizing a performance bug repair system. Turning to FIG. 2A, there is shown a system 200 where the performance bug repair system operates within an IDE 202. The IDE 202 is a software development tool that provides tools for software development, such as without limitation, source code editors, compilers, debuggers, build automation tools, and the like. The IDE 202 may incorporate a source code editor 204 that interacts with a developer to generate or edit source code 212. The performance bug repair system 208 may operate as a background process that monitors the source code input into the source code editor 204.

At various times during the development, the performance bug repair system 208 may receive a source code method 206 extracted from the source code editor. The source code method is analyzed by the performance bug repair system 208 to generate repair code candidates 210.

FIG. 2B illustrates a system 220 where the performance bug repair system 226 operates within a source code version control system 222. The performance bug repair system 226 interacts with a source code repository 224 to generate repair code candidates for a source code method in a pull request identified as having a performance bug. The source code repository 224 detects a pull request 230 and identifies a performance bug in the source code subject to the pull request 232. The performance bug may be detected using profiler data which finds the client methods that lie on a hot-path and determines whether the method bodies contain any inefficient patterns. The hot-path is a set of call stacks that consume the most resources. Alternatively, the Microsoft Optimization Insights tool may be used which analyzes profiler traces and finds performance issues on the hot-path. The system 222 notifies the source code repository of its findings 234 and returns the list of repair code candidates to the developer 228.

Figure 3:
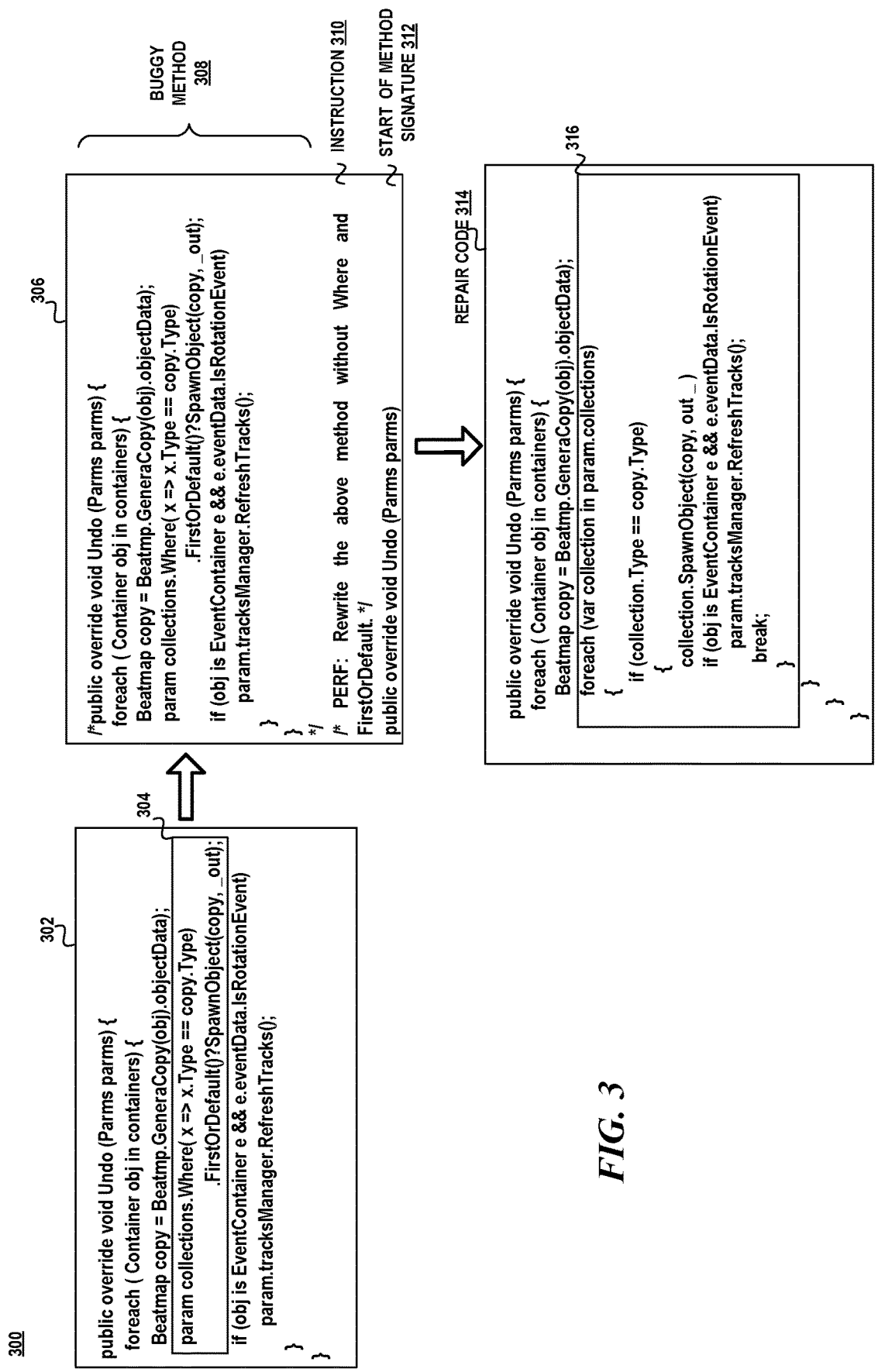
FIG. 3 is an example illustrating generation of repair code for a method having a performance bug.

Attention now turns to an illustration of the repair code process. FIG. 3 illustrates an exemplary C # method, Undo, 302 having a performance bug at line 304 which is a Language Integrated Query ("LINQ"). A LINQ query is a query expression that can be used to extract data from a collection, array, etc. The methods Where and FirstOrDefault iterate over a collection to find all the entries matching a predicate when only the first match is needed. The search should stop early and instead iterates over the entire collection. This is considered a performance bug since it may not need to iterate over the size of the collection to find the first match. As such, line 304 is considered a performance bug in this method.

A code transformation instruction is found in the knowledge database that corresponds to an abstract bug pattern for line 304. The abstract bug pattern for line 304 is as follows: <Node0>, Where (<Node0>), FirstOrDefault( )? <Node0>. This abstract bug pattern is used as an index into the knowledge base which returns the code transformation instruction, PERF: Rewrite the above method without Where and FirstOrDefault 310. A prompt 306 is generated which contains the buggy method 308, the code transformation instruction 310 and the start of a method signature for the repair code 312.

The repair code 314 that is generated by the neural code generation model is shown in box 314. The suggested fix is to unroll the LINQ query into a foreach loop which can stop early when a matching entry is found. The repair code 314 saves on LINQ overheads such as the allocations and the garbage collection process to reclaim the allocations.

Methods.

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
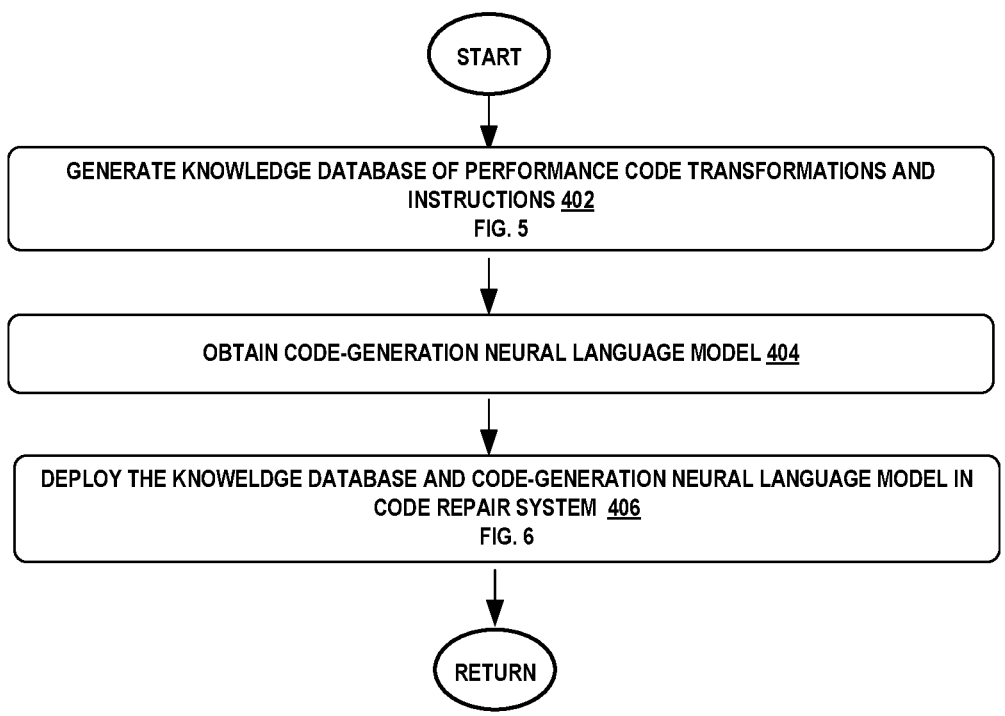
FIG. 4 is a flow diagram illustrating an exemplary method of the performance bug repair system.

Turning to FIG. 4, there is shown a method 400 of the performance bug repair system. The knowledge database is generated before the repair system is operational (block 402). A neural code generation model is obtained (block 404) and the knowledge database and the neural code generation model are deployed in a performance bug repair system (block 406).

Figure 5:
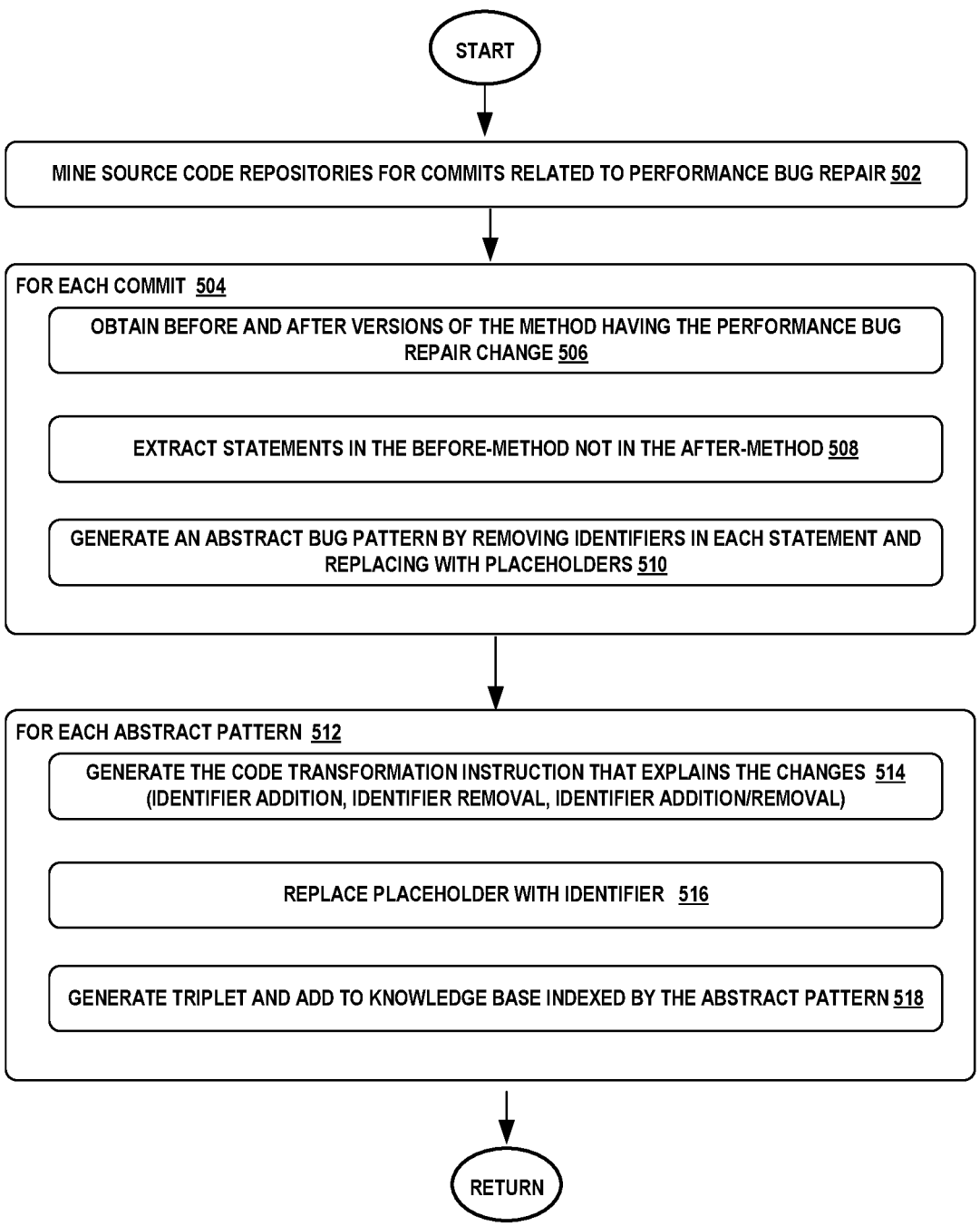
FIG. 5 is flow diagram illustrating an exemplary method for generating the knowledge database of code transformation instructions.

Turning to FIGS. 1 and 5, there is shown a method 500 for generating the knowledge database. The performance bug mining engine 110 mines one or more source code repositories 106 for commits having changes made for a performance bug issue (block 502). The commits are mined from pull requests. A pull request is an operation in a version-controlled source code repository that requests an assigned person to review changes made to a code base before the changes are merged. The pull request includes a comment section, a title, a description, the before-code and the after-code. The before-code is the source code before the changes were made to correct the performance bug and the after-code contains the repair code. In the description, the author of the pull request typically describes the changes made to the code. A pull request is composed of one or more commits.

A commit is an individual change to a file or set of files. The commit contains a commit message and a changeset or diff. The diff represents the differences between the current and previous version of the files modified within a commit. In the comment section, developers add in comments regarding the proposed change, such as "PERF" or "[PERF]" which is typically used to identify that a change was made to repair a performance bug. Commits related to a change to repair a performance bug are extracted from the source code repository along with the diff (block 502).

From each commit associated with a performance bug repair (block 504), the source code file before the changes were made and the source code file after the changes were made is obtained to extract the before-method and the after-method of the methods of the file having been modified by the commit (block 506).

Given a before-method from the diff, m, having K statements and its corresponding modified code, m', having K' statements, the statements that appear in the before-method, m, but not in the modified code, m', are extracted and represented as S (block 508).

For each statement in S, project-specific identifiers, such as variable names and user-defined functions names (e.g., method, API) are replaced with placeholders (block 510). Frequently-used function names of a library are retained, such as method names of the .NET library of the C # programming language.

For example, consider the following C # source code snippet:

Foo( ).Where (x=>x.Bar( )).FirstOrDefault( );

The project identifiers in this example are the identifiers or literals, Foo and Bar. Where and FirstOrDefault are not project identifiers since they are frequently used .NET library functions in C # projects. The following is the corresponding abstract bug pattern:

<Node0>.Where (<Node0>).FirstOrDefault( );

The abstract bug pattern replaces the identifiers with the placeholder <Node0>. The abstract bug pattern represents a known inefficient usage pattern where the functions, Where and FirstOrDefault, are chained together inefficiently. The source code would be re-written more efficiently by condensing the statement to remove the Where call or simply unrolling the query into an explicit loop. The abstract bug pattern represents a pattern of changes that may be repeated across different projects of a repository and may correspond to a common performance issue.

A code transformation instruction is generated for each abstract bug pattern. For each abstract bug pattern (block 512), a code transformation instruction is generated based on the identifiers added in the after-code or removed from the before-code (block 514). The code transformation instruction replaces each placeholder with the appropriate identifier (block 516).

In an aspect, the code transformation instructions include Identifier Addition, Identifier Removal and Identifier Addition and Removal. Identifier Addition is an instruction that represents that the model should rewrite the source code with additional identifiers or APIs needed to resolve the performance bug issue, such as a new function call or an additional parameter added to an existing call. An exemplary Identifier Addition instruction is "PERF: Rewrite the above method with <X>", where X is the added identifier. This instruction is used when an identifier from the before-code is not in the after-code and the after-code contains the added identifier.

Identifier Removal is an instruction that represents that the model should remove the usage of some identifiers or APIs such as the removal of the use of some inefficient APIs, within the code. An exemplary Identifier Removal instruction is "PERF: Rewrite the above method without <X>", where X is the removed identifier. This instruction is used when an identifier from the before-code is not in the after-code and the after-code does not contain any additional identifiers.

Identifier Addition and Removal is an instruction that represents the case where the model should replace one set of identifiers or APIs with another set of identifiers or APIs. An exemplary Identifier Addition and Removal instruction is "PERF: Use <X> instead of <Y> in the above method", where X is the added identifier in the after-code and Y is the identifier of the before-code. This instruction is used when an identifier from the before-code is not in the after-code and the after-code contains an additional identifier not present in the before-code.

The code transformation instruction generator 118 generates a triplet consisting of the before method, the after method, and the code transformation instruction which is inserted into the knowledge database using the abstract bug pattern as the corresponding index (block 518).

Figure 6:
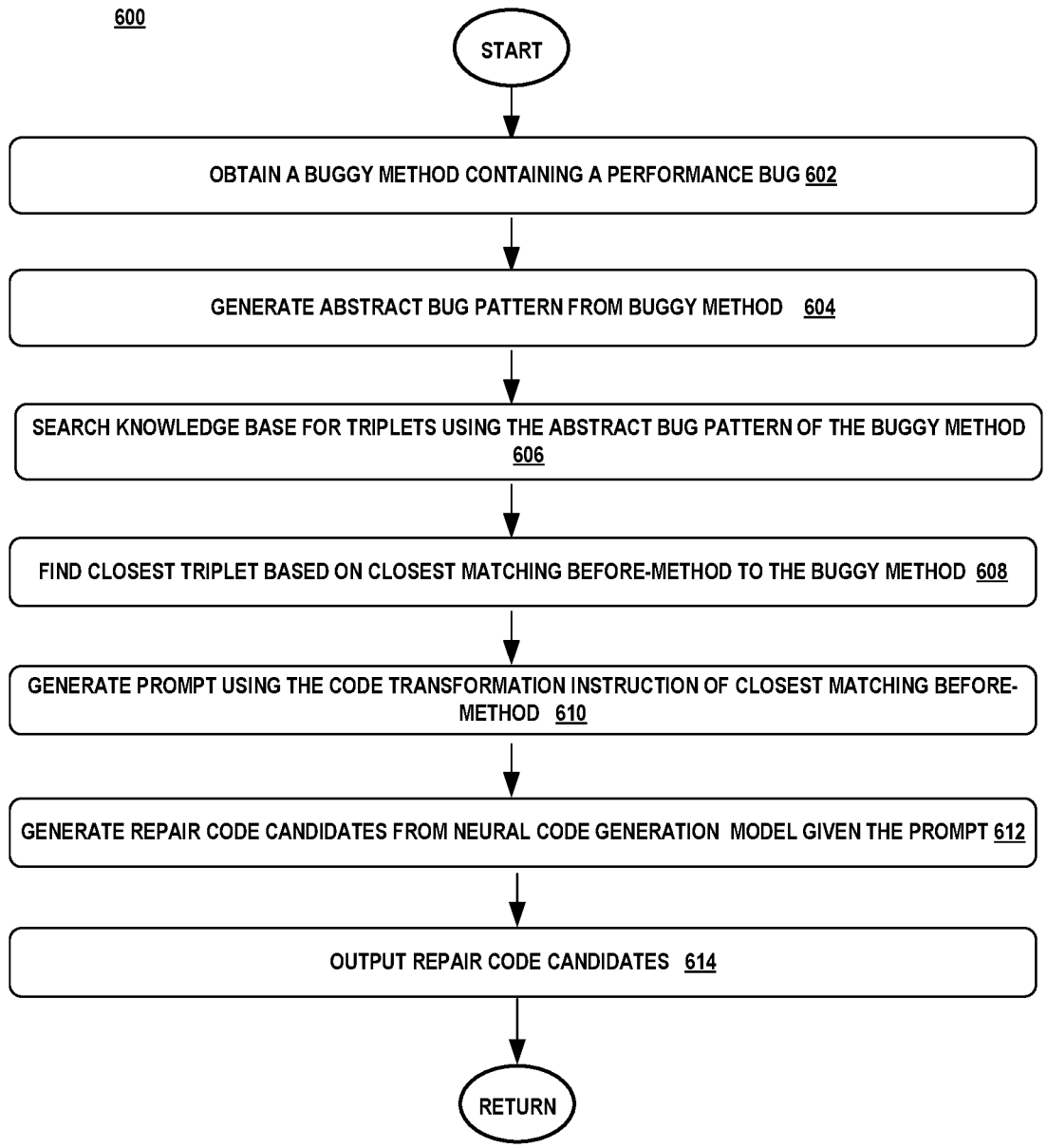
FIG. 6 is a flow diagram illustrating an exemplary method for generating repair code in a target inference system.

Turning to FIGS. 1 and 6, there is shown an exemplary method 600 of the inference process where the neural code generation model generates repair code for a buggy method using a code transformation instruction from the knowledge database.

A buggy method is obtained containing an expensive line of source code that is attributable to a performance bug (block 602). The abstract bug pattern engine 114 generates an abstract bug pattern for the line of source code having the performance bug (block 604). The identifiers in the line of source code having the performance bug are replaced with placeholders thereby generating abstract bug pattern $p_b$. The abstract bug pattern is then used as a query to the knowledge database to find at most $K_p$ number of code changes and instruction triplets ($m_k$, $m'_k$, $t_k$), where $m_k$ is the before-method code, $m'_k$ is the after-method code, and $t_k$ is the code transformation instruction, where k ranges from 1 to $K_p$ (block 606).

The code transformation instruction that corresponds to the before-method that is closest to the buggy method is selected (block 608). The closest-matching before-method is determined based on a similarity between the source code of each before-method and the source code of the buggy method. The code transformation instruction of the before-method having the closest similarity is selected as the augmented-input to the neural code generation model.

The prompt generator 138 generates a prompt that contains the buggy method, optionally enclosed in comments, the code transformation instruction, and optionally, the start of a method signature for the repair code (block 610).

The prompt is input to the beam search engine 142 which applies it to the neural code generation model 144 to generate a repair method for the buggy method (block 612). The beam search engine 142 uses a beam search to predict the most likely repair code candidates to repair the buggy method. A beam search iteratively generates tokens by invoking the neural code generation model. The output of the neural code generation model 144 is a matrix of token probabilities for each position in a repair code candidate sequence. The beam search engine 142 concentrates on the k most probable tokens at each iteration to get the best path to the most likely repair code candidate sequence. At each iteration, each of the k most probable tokens are concatenated with the tokens in the preceding iterations to form a partial repair code candidate sequence.

A beam search uses a breadth-first search to build a search tree. The search tree is composed of nodes at one or more inference levels. Each node represents a probability distribution generated by the neural code generation model for the tokens in the model vocabulary. At each level, only the top k tokens having the highest probabilities from the output distribution generated by the neural code generation model are expanded to the next inference level. The variable k is preconfigured and also referred to as the beam width. Each of the k tokens is then expanded into a search that updates the current context sequence with the selected token to input into the neural code generation model to generate an additional probability distribution for the next token in a sequence. This process is repeated until an end-of-sequence token is predicted as being the next likely token candidate or an exit condition occurs (block 612).

Upon the completion of the beam search, the beam search engine outputs the top k repair code candidates likely to repair the buggy source code method which are sent back to the target application (block 614).

Exemplary Operating Environment

Figure 7:
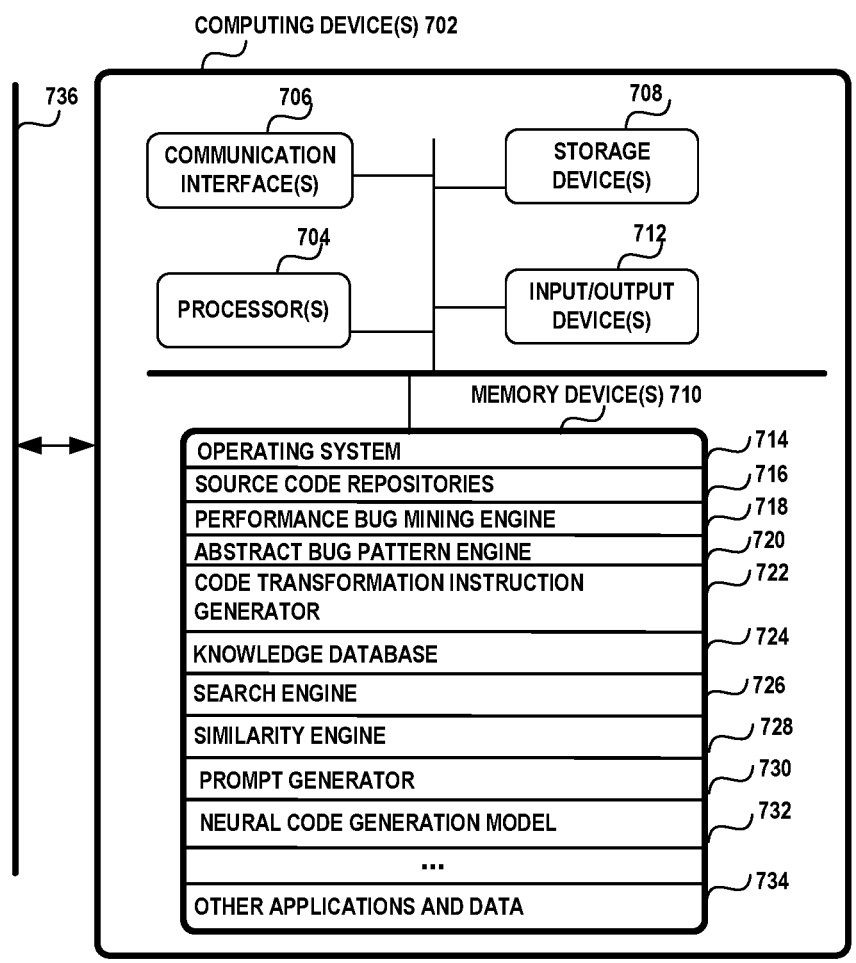
FIG. 7 is a block diagram illustrating an exemplary operating environment.

Attention now turns to a discussion of an exemplary operating environment. FIG. 7 illustrates an exemplary operating environment 700 in which one or more computing devices 702 are used to generate the knowledge database and generate the repair code candidates. However, it should be noted that the aspects disclosed herein is not constrained to any particular configuration of devices.

A computing device 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

The computing device 702 may include one or more processors 704, one or more communication interfaces 706, one or more storage devices 708, one or more input/output devices 712, and one or more memory devices 710. A processor 704 may be any commercially available or customized processor and may include dual microprocessors and multi-processor architectures. A communication interface 706 facilitates wired or wireless communications between the computing device 702 and other devices. A storage device 708 may be computer-readable medium that does not contain propagating signals, such as modulated data signals transmitted through a carrier wave. Examples of a storage device 708 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 708 in the computing device 702. The input/output devices 712 may include a keyboard, mouse, pen, voice input device, touch input device, display, speakers, printers, etc., and any combination thereof.

A memory device or memory 710 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 710 may also include one or more external storage devices or remotely located storage devices that do not pertain to propagated signals, such as modulated data signals transmitted through a carrier wave.

The memory device 710 may contain instructions, components, and data. A component is a software program that performs a specific function and is otherwise known as a module, program, component, and/or application. The memory device 710 may include an operating system 714, source code repositories 716, performance bug mining engine 718, abstract bug pattern engine 720, code transformation instruction generator 722, knowledge database 724, search engine 726, similarity engine 728, prompt generator 730, neural code generation model 732, and other applications and data 734.

A computing device 702 may be communicatively coupled via a network 736. The network 736 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 736 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of generating repair code for a source code method having a performance bug. The technical features associated with addressing this problem is the knowledge database of code transformation instructions and the neural code generation model that generates the repair code given a code transformation instruction. The technical effect achieved is the enhanced accuracy without undue increased computational burden.

The use of a pre-trained neural code generation model with the code transformation instruction guides a pre-trained model to learn to predict the repair code without having to fine-tune the model with samples of repair code fixes to learn to predict the repair code. The elimination of the fine-tuning step conserves computing resources and alleviates the need to find or create a large high-quality labeled dataset of performance fixes to fine-tune the model.

One of ordinary skill in the art understands that the technical effects are the purpose of a technical embodiment. The mere fact that a calculation is involved in an embodiment does not remove the presence of the technical effects or alter the concrete and technical nature of the embodiments. Operations such as mining a source code repository for commits associated with a performance bug, generating abstract bug patterns, creating code translation instructions, generating a knowledge database with code translation instructions and associated methods, searching the knowledge database, extracting the code transformations and associated data from the knowledge database, and operating a neural code generation model are understood herein as inherently digital. The human mind cannot interface directly with a CPU or network interface card, or other processor, or with RAM or other digital storage, to read or write the necessary data and perform the necessary operations on digital values in the manner disclosed herein.

The embodiments are also presumed to be capable of operating at scale, such as, without limitation, mining over one gigabyte of source code commits to generate the code transformation instructions to utilize a neural code generation model having billions of parameters and to generate repair code in a target system (e.g., GitHub, IDE) at scale within tight timing constraints in production environments, or in testing labs for production environments as opposed to being mere thought experiments.

Conclusion

A system is disclosed comprising one or more processors and a memory that stores one or more programs that are configured to be executed by the one or more processors. The one or more programs including instructions to perform acts that: obtain a method having a performance bug; produce an abstract bug pattern for the performance bug, wherein the abstract bug pattern includes source code lines having the performance bug without an identifier; search a knowledge database, given the abstract bug pattern, for at least one code transformation instruction, wherein the at least on code transformation instruction represents changes made to repair a similar performance bug; obtain the at least one code transformation instruction matching the abstract bug pattern from the knowledge database; create a prompt for the method, wherein the prompt includes the method having the performance bug and the at least one code transformation instruction; and generate repair code for the method using a neural code generation model given the prompt.

In an aspect, the prompt further comprises a starting method signature for the repair code. In an aspect, the at least one code transformation instruction comprises an Identifier Addition instruction that indicates how to rewrite the method with additional identifiers. In an aspect, the at least one code transformation instruction comprises an Identifier Removal instruction that represents how to remove usage of at least one identifier in the method. In an aspect, the at least one code transformation instruction comprises an Identifier Removal and Addition instruction that represents how to replace a set of identifiers with another set of identifiers.

In an aspect, the neural code generation model has only been pre-trained to generate source code. In an aspect, the neural code generation model includes a neural transformer model with attention. In an aspect, the identifier includes a variable name, a user-defined function name, or a user-defined Application Programming Interface (API).

A computer-implemented method is disclosed, the method comprises: mining a source code repository for a source code method having been repaired for a performance bug; creating an abstract bug pattern from lines of the source code method including the performance bug without an identifier; generating a code transformation instruction for the abstract bug pattern, wherein the code transformation instruction is based on differences between a before-method of the source code method having been repaired for a performance bug and an after-method of the source code method having been repaired for the performance bug, wherein the code transformation instruction indicates changes made to a similar performance bug; and utilizing the code transformation instruction in a prompt given to a neural code generation model to predict repair code for a buggy method having a similar abstract bug pattern as the abstract bug pattern of the code transformation instruction.

In an aspect, creating the abstract bug pattern from lines of source code of the performance bug, further comprises: replacing an identifier in the lines of the source code of the performance bug with a placeholder; and generating the code transformation instruction for the abstract bug pattern further comprises replacing the placeholder with an identifier in accordance with the code transformation instruction.

In an aspect, generating the code transformation instruction for the abstract bug pattern further comprises: identifying a first identifier in a before-code method missing in an after-code method and a second identifier added to the after-code method; and generating an identifier addition instruction as the code transformation instruction, wherein the identifier addition instruction indicates to rewrite the lines of source code with the performance bug with the second identifier.

In an aspect, generating the code transformation instruction for the abstract bug pattern further comprises: identifying a first identifier in a before-code method missing in an after-code method; and generating an identifier removal instruction as the code transformation instruction, wherein the identifier removal instruction indicates to remove the first identifier in the lines of source code with the performance bug.

In an aspect, generating the code transformation instruction for the abstract bug pattern further comprises: identifying a first identifier in a before-code method replaced with a second identifier in an after-code method; and generating an identifier addition and removal instruction as the code transformation instruction, wherein the identifier addition and removal instruction indicates to replace the first identifier in the lines of source code with the performance bug with the second identifier.

In an aspect, the identifier includes a variable name, a user-defined function name, or a user-defined Application Programming Interface (API). In an aspect, the neural code generation model is a neural transformer model with attention. In an aspect, the method further comprises storing the code transformation instruction in a knowledge database indexed by the abstract bug pattern of the code transformation instruction.

A computer-implemented method is disclosed comprises: receiving a source code fragment having a performance bug; producing an abstract bug pattern from lines of the source code fragment having the performance bug, wherein the abstract bug pattern eliminates identifiers within the lines of the source code fragment having the performance bug; searching a knowledge database, given the abstract bug pattern, for at least one code transformation instruction, wherein the code transformation instruction represents code changes used to repair a similar performance bug; retrieving, from the knowledge database, the at least one code transformation instruction matching the abstract bug pattern; creating a prompt for the source code fragment, wherein the prompt includes the source code fragment having the performance bug and the at least one code transformation instruction; and utilizing a neural code generation model, given the prompt, to generate repair code for the source code fragment.

In an aspect, the code transformation instruction comprises an Identifier Addition instruction that represents how to rewrite the method with additional identifiers. In an aspect the code transformation instruction comprises an Identifier Removal instruction that represents how to remove usage of an identifier in the method. In an aspect, the code transformation instruction comprises an Identifier Removal and Addition instruction that represents how to replace a set of identifiers with another set of identifiers.

In an aspect the identifier includes a variable name, a user-defined function name, or a user-defined Application Programming Interface (API).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system comprising:
one or more processors; and
a memory that stores one or more programs that are configured to be executed by the one or more processors, the one or more programs including instructions to perform acts that:
obtain a method having a performance bug;
produce an abstract bug pattern for the method having the performance bug, wherein the abstract bug pattern for the method having the performance bug includes source code lines of the method having the performance bug without identifiers;
search a knowledge database, given the abstract bug pattern for the method having the performance bug, for at least one code transformation instruction, wherein the at least one code transformation instruction represents changes made to repair a similar performance bug;
obtain the at least one code transformation instruction matching the abstract bug pattern for the method having the performance bug from the knowledge database;
create a prompt for the method, wherein the prompt for the method includes the method having the performance bug and the at least one code transformation instruction; and
generate repair code for the method having the performance bug using a neural code generation model given the prompt for the method.

2. The system of claim 1, wherein the prompt for the method further comprises a starting method signature for the repair code for the method.

3. The system of claim 1, wherein the at least one code transformation instruction comprises an Identifier Addition instruction that indicates how to rewrite the method with additional identifiers.

4. The system of claim 1, wherein the at least one code transformation instruction comprises an Identifier Removal instruction that represents how to remove usage of at least one identifier in the method.

5. The system of claim 1, wherein the at least one code transformation instruction comprises an Identifier Removal and Addition instruction that represents how to replace a set of identifiers with another set of identifiers.

6. The system of claim 1, wherein the neural code generation model has only been pre-trained to generate source code.

7. The system of claim 1, wherein the neural code generation model includes a neural transformer model with attention.

8. The system of claim 1, wherein the identifiers include a variable name, a user-defined function name, or a user-defined Application Programming Interface (API).

9. A computer-implemented method comprising:
mining a source code repository for a source code method having been repaired for a performance bug;
creating an abstract bug pattern from lines of the source code method including the performance bug without identifiers;
generating a code transformation instruction for the abstract bug pattern, wherein the code transformation instruction for the abstract bug pattern is based on differences between a before-method of the source code method having been repaired for the performance bug and an after-method of the source code method having been repaired for the performance bug, and wherein the code transformation instruction for the abstract bug pattern indicates changes made to repair a similar performance bug; and
utilizing the code transformation instruction for the abstract bug pattern in a prompt for the source code method given to a neural code generation model to generate repair code for a buggy source code method having a similar abstract bug pattern as the abstract bug pattern of the code transformation instruction.

10. The computer-implemented method of claim 9, wherein creating the abstract bug pattern from the lines of the source code method further comprises replacing an identifier in the lines of the source code method with a placeholder; and
wherein generating the code transformation instruction for the abstract bug pattern further comprises replacing the placeholder with an identifier in accordance with the code transformation instruction for the abstract bug pattern.

11. The computer-implemented method of claim 9, wherein generating the code transformation instruction for the abstract bug pattern further comprises:
identifying a first identifier in a before-code method missing in an after-code method and a second identifier added to the after-code method; and
generating an identifier addition instruction as the code transformation instruction for the abstract bug pattern, wherein the identifier addition instruction indicates to rewrite the lines of the source code method with the second identifier.

12. The computer-implemented method of claim 9, wherein generating the code transformation instruction for the abstract bug pattern further comprises:
identifying a first identifier in a before-code method missing in an after-code method; and
generating an identifier removal instruction as the code transformation instruction for the abstract bug pattern, wherein the identifier removal instruction indicates to remove the first identifier in the lines of the source code method.

13. The computer-implemented method of claim 9, wherein generating the code transformation instruction for the abstract bug pattern further comprises:

identifying a first identifier in a before-code method replaced with a second identifier in an after-code method; and generating an identifier addition and removal instruction as the code transformation instruction for the abstract bug pattern, wherein the identifier addition and removal instruction indicates to replace the first identifier in the lines of the source code method with the second identifier.

14. The computer-implemented method of claim 9, wherein the identifiers include a variable name, a user-defined function name, or a user-defined Application Programming Interface (API).

15. The computer-implemented method of claim 9, further comprising:

storing the code transformation instruction for the abstract bug pattern in a knowledge database indexed by the abstract bug pattern of the code transformation instruction.

16. A computer-implemented method comprising:

receiving a source code fragment having a performance bug;

producing an abstract bug pattern from lines of the source code fragment having the performance bug, wherein the abstract bug pattern eliminates identifiers within the lines of the source code fragment having the performance bug;

searching a knowledge database, given the abstract bug pattern, for at least one code transformation instruction, wherein the at least one code transformation instruction represents code changes used to repair a similar performance bug;

retrieving, from the knowledge database, the at least one code transformation instruction matching the abstract bug pattern;

creating a prompt for the source code fragment, wherein the prompt for the source code fragment includes the source code fragment having the performance bug and the at least one code transformation instruction; and utilizing a neural code generation model, given the prompt for the source code fragment, to generate repair code for the source code fragment having the performance bug.

17. The computer-implemented method of claim 16, wherein the at least one code transformation instruction comprises an Identifier Addition instruction that represents how to rewrite the source code fragment with additional identifiers.

18. The computer-implemented method of claim 16, wherein the at least one code transformation instruction comprises an Identifier Removal instruction that represents how to remove usage of an identifier in the source code fragment.

19. The computer-implemented method of claim 16, wherein the at least one code transformation instruction comprises an Identifier Removal and Addition instruction that represents how to replace a set of identifiers with another set of identifiers.

20. The computer-implemented method of claim 16, wherein the identifiers include a variable name, a user-defined function name, or a user-defined Application Programming Interface (API).

\* \* \* \* \*